US007562456B2

(12) United States Patent
Roehm et al.

(10) Patent No.: US 7,562,456 B2
(45) Date of Patent: Jul. 21, 2009

(54) SYSTEM COMPRISED OF A CHIP CATCHER AND A SAFETY GUARD FOR A POWER TOOL

(75) Inventors: Heiko Roehm, Stuttgart (DE); Steffen Weber, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 10/556,985

(22) PCT Filed: Dec. 14, 2004

(86) PCT No.: PCT/EP2004/053446

§ 371 (c)(1),
(2), (4) Date: Nov. 16, 2005

(87) PCT Pub. No.: WO2005/070617

PCT Pub. Date: Aug. 4, 2005

(65) Prior Publication Data

US 2007/0039189 A1 Feb. 22, 2007

(30) Foreign Application Priority Data

Jan. 27, 2004 (DE) .................. 10 2004 004 003

(51) Int. Cl.
*B27B 9/00* (2006.01)
*B27G 3/00* (2006.01)
*B23Q 11/00* (2006.01)
(52) U.S. Cl. .......................... 30/390; 30/124
(58) Field of Classification Search ............... 30/124, 30/390, 391; 144/252.1; 451/453; D8/70
See application file for complete search history.

(56) References Cited

U.S. PATENT DOCUMENTS

| 2,229,598 | A | * | 1/1941 | Nash ........................... 451/236 |
| 3,123,111 | A | * | 3/1964 | Mattson ........................ 30/390 |
| 3,882,598 | A | * | 5/1975 | Earle et al. ..................... 30/390 |
| 4,414,743 | A | * | 11/1983 | Pioch et al. .................... 30/124 |
| 4,675,999 | A | | 6/1987 | Ito et al. ........................ 30/124 |
| 5,074,044 | A | * | 12/1991 | Duncan et al. ................. 30/124 |
| 5,084,972 | A | * | 2/1992 | Waugh ......................... 30/124 |
| 5,327,649 | A | * | 7/1994 | Skinner ........................ 30/124 |
| 5,537,748 | A | * | 7/1996 | Takahashi et al. ............. 30/124 |
| D376,526 | S | * | 12/1996 | Hepburn ....................... D8/70 |
| 5,675,895 | A | | 10/1997 | Mori et al. ..................... 30/124 |
| 6,219,922 | B1 | * | 4/2001 | Campbell et al. ............. 30/124 |
| 7,275,326 | B2 | * | 10/2007 | Tanimoto et al. ............. 30/391 |
| 2005/0103172 | A1 | * | 5/2005 | Bohne et al. ................... 83/168 |
| 2009/0007441 | A1 | * | 1/2009 | Schnell et al. ................. 30/390 |

FOREIGN PATENT DOCUMENTS

| DE | 35 42 263 A1 | 6/1987 |
| EP | 0 503 465 B1 | 8/1995 |
| GB | 523 220 | 7/1940 |

* cited by examiner

*Primary Examiner*—Hwei-Siu C Payer
(74) *Attorney, Agent, or Firm*—Michael J. Striker

(57) ABSTRACT

A system is comprised of a chip catcher and a safety guard for a power tool that generates chips, in particular a hand-guided power tool, having an inlet region for admitting a flow of air containing a chip/air mixture and for detachably connecting a chip ejector and having an inlet region for admitting a flow of air containing a chip/air mixture and for detachably connecting to a chip ejector and having an encompassing housing that is provided for attachment to the safety guard. The housing contains an air outlet spatially separate from a chip-collecting region for chips.

14 Claims, 3 Drawing Sheets

SYSTEM COMPRISED OF A CHIP CATCHER AND A SAFETY GUARD FOR A POWER TOOL

CROSS-REFERENCE TO A RELATED APPLICATION

The invention described and claimed hereinbelow is also described in German Patent Application DE 10 2004 003.6 filed on Jan. 27, 2004. This German Patent Application provides the basis for a claim of priority of invention under 35 U.S.C. 119(a)-(d).

BACKGROUND OF THE INVENTION

The invention is based on a chip catcher and a system comprised of a chip catcher and a safety guard for a power tool, in particular a hand-guided power tool.

When working with hand-guided circular saws and similar power tools such as planers, routers, and the like, large quantities of chips are produced that are conveyed from a safety guard to the outside, either directly or indirectly, by means of a chip ejector, are sucked away by a vacuum connection, or are captured in a chip bag. Typically, a round chip ejector is provided on the side of the safety guard so that the chips are ejected out the side of the power tool. In some cases, ejected chips or a vacuum hose prove inconvenient to a user. Frequently, the chip ejector is embodied so that the vacuum hose or the chip bag can be inserted directly into the chip ejector. In so doing, interfering moments of the vacuum hose can impinge on the saw blade.

There are also known hand-guided circular saws whose round chip ejector extends back parallel to the safety guard. If the saw is operated without the vacuum hose or chip bag connected, the user can get in the way of the flow of chips.

Alternatively, there are known hand-guided circular saws that eject the chips next to the hand-guided circular saw at a low speed by means of a chip chute. A dust bag or vacuum hose can only be attached by means of an adapter, which hinders the function of passive chip catching devices by slowing down the chips.

There are also known safety guards that are able to trap chips. They are provided with a closable vacuum connection fitting. It is problematic that work must always be carried out with the box in place since it is an integral component of the safety guard. If the box is full, it must be emptied, as a result of which work must be interrupted and the entire hand-guided circular saw must be carried to a refuse container.

A chip bag is in fact removable, but has the disadvantage that the porous envelope material constitutes an air resistance so that only part of the chip-laden air flows into the chip bag while a significant portion of the chips escape to the outside through other openings in the safety guard.

SUMMARY OF THE INVENTION

The invention is based on a system comprised of chip catcher for a power tool that generates chips, in particular a hand-guided power tool, having an inlet region for admitting a flow of air containing a chip/air mixture and for detachably connecting to a chip ejector and to an encompassing housing that is provided for attachment to a safety guard.

According to the invention, the housing contains an air outlet spatially separate from a chip-collecting region for chips. The chip-collecting region carries away the purified air while the chips remain behind in the chip catcher and can either be collected there and removed later or can be ejected at an intentionally low speed next to the hand-guided circular saw. This can also occur at intervals without having to interrupt the work. In order to remove chips collected in the chip catcher, the chip catcher can also be removed from the power tool or its safety guard and conveniently emptied.

If a deflector is provided as a division between the air outlet and the chip-collecting region, then a supplied chip/air mixture can be easily separated out into chips and air. The air can travel through the deflector and out through the outlet, while the chips are conveyed into the chip-collecting region and are slowed through multiple deflection between the deflector and the housing. A separate filter can be omitted, thus eliminating costs and maintenance work for cleaning or replacing a filter. The chip catcher uses the cyclone principle to separate air and chips. According to the cyclone principle, the air is whirled, causing chips, as heavier particles, to be accelerated against the inner wall of the housing and fall into the chip-collecting region. The air exits the chip catcher, purified. The chips remain largely inside the chip catcher.

The air can be separated from the chips in a particularly effective manner if, between the inlet region and the air outlet, reversing means are provided for reversing the direction of the air flow in the housing. It is beneficial for the air outlet to be situated just underneath the inlet region. The air that is chip-laden at first must travel a long geometric path before it can flow out of the chip catcher, freed of chips. Preferably, the air outlet is situated so that the outgoing air is deflected laterally in relation to the incoming air.

The housing is preferably essentially air-impermeable so that the air can escape either through the air outlet or also through a flap. The air resistance of the chip catcher is therefore low. It is advantageous to provide a rigid housing made of plastic or metal, for example sheet metal. The chip catcher can be easily emptied and cleaned.

An advantageous and convenient form of the housing for a use of the chip catcher on a safety guard of a power tool with a rip fence can be achieved if the housing tapers from the inlet region to the chip-collecting region. The chip catcher can be easily mounted onto the power tool or its safety guard. The user is able to operate the power tool unhindered. The chip catcher is easy to remove and maneuver. The housing, however, can also have other forms that appear practical to those skilled in the art, which are adapted to the respective concrete embodiment of the power tool. In this context, it is advantageous to have the largest cross section possible for a beneficial speed reduction of the chips in the chip-collecting region. This has the additional advantage of having more space available for storing the collected chips than in the tapering housing.

Preferably, the chip-collecting region is provided with a flap for emptying the chips. When filled with chips, the chip catcher can be removed from the power tool or its safety guard and emptied. The chip catcher can also be retrofitted for use with conventional safety guards that have a chip ejector. In this case, the chip catcher is situated next to the safety guard.

The present invention also proposes a system comprised of a chip catcher and a safety guard, which is equipped with a chip ejector, for a power tool, in which the chip catcher is adapted to a cover contour of the safety guard. Preferably, the chip catcher is integrated into a cover contour of the safety guard. The user can maneuver the power tool easily and conveniently without being bothered by the presence of the chip catcher. The chip ejector is favorably situated parallel to a saw blade covered by the safety guard, in particular on a circumference of the safety guard. The influence of interfering moments during operation of the hand-guided power tool can be minimized by means of the geometric arrangement.

If the chip catcher is detachably connected to the safety guard, the user can decide whether to work with the chip catcher or to attach a vacuum hose instead. Preferably, the chip catcher has an inlet region that corresponds to a chip ejector of the safety guard and that is embodied, for example, with a cone shape the same as that of a conventional vacuum hose fitting. The connection can also be embodied in the form of a lock bush, with a flange, or in some other logically designed manner. The components are easy to exchange. The choice of whether a chip catcher or a vacuum hose is to be connected can be made as a function of current working conditions. When the vacuum hose is used, it is advantageous that the chip ejector has an optimal orientation for working with the vacuum hose and in addition, the size of the safety guard is reduced by the removal of the chip catcher. In addition, the chip ejector to which the vacuum hose is attached is situated close to the tool, preferably a saw blade, so that forces resulting from a rigidity and friction of the vacuum hose are only able to influence the work results slightly.

If the chip catcher has a flap for removing chips, then work can be performed with the flap open or closed. If creating a mess in the work environment does not present a problem, then work can be carried out with the chip catcher and an open flap. The chips are conveyed outside with the least possible inconvenience to the user. The flap is preferably situated on the chip catcher close to the work piece so that the chips can be easily removed from the chip catcher. The peace and quiet of the work environment is improved by working with the flap closed. The chip catcher need only be emptied from time to time. It is not absolutely necessary to interrupt work and the chip catcher does not have to be removed. The collected chips can also be deposited next to the power tool by temporarily opening the flap. The flap is then closed again.

If chips can be ejected at a low speed next to the power tool when the flap is open, then the chips can be conveyed outside with the least possible inconvenience to the user. When the flap is in the open state, it preferably serves as a chip chute and/or as an extension of a chip chute. This avoids an unnecessary agitation of the ejected chips.

The invention can be used in all power tools in which chips or material particles are generated in the machining zone, which the tool being used conveys at speed into a safety guard or into a chip ejector, for example circular saws, planers, routers, grinders, and the like.

Other advantages ensue from the following description of the drawings. The drawings show an exemplary embodiment of the invention. The drawings, the specification, and the claims contain numerous characteristics in combination. Those skilled in the art will also suitably consider the characteristics individually and unite them in other meaningful combinations.

DESCRIPTION OF THE PREFERRED EMBODIMENTS

Figure 1:
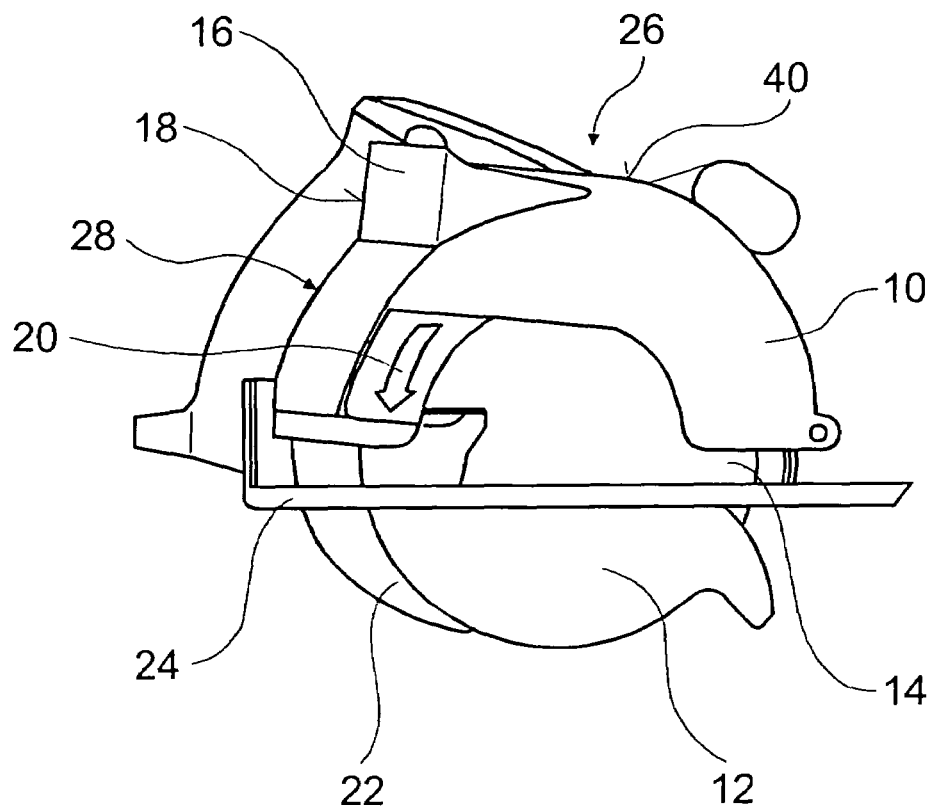
FIG. 1 shows a side view of a preferred hand-guided circular saw, without a chip catcher.

Parts that remain essentially the same have been provided with the same basic reference numerals in the drawings.

FIG. 1 shows a side view of a power tool 26 embodied in the form of a preferred hand-guided circular saw, without a chip catcher. A saw blade 14 is covered to a large degree by a movable pivoting lower guard 12 and a stationary safety guard 10. The safety guard 10 has a cover contour 28. A baseplate 24 serves to guide the power tool 26 over a work piece to be machined. During sawing, chips inside the safety guard 10 are transported in the rotation direction 20 of the saw blade 14 and exit the safety guard 10 via a chip ejector 16 through an opening 18. The chip ejector 16 is situated on the circumference of the safety guard 10 and is designed so that either a chip catcher or a vacuum close can be fastened to it; preferably the chip ejector 16 is embodied as round and conical. In addition, a conventional rip fence 22 is provided; the present invention can also be used for hand-guided circular saws without a rip fence 22.

Figure 2:
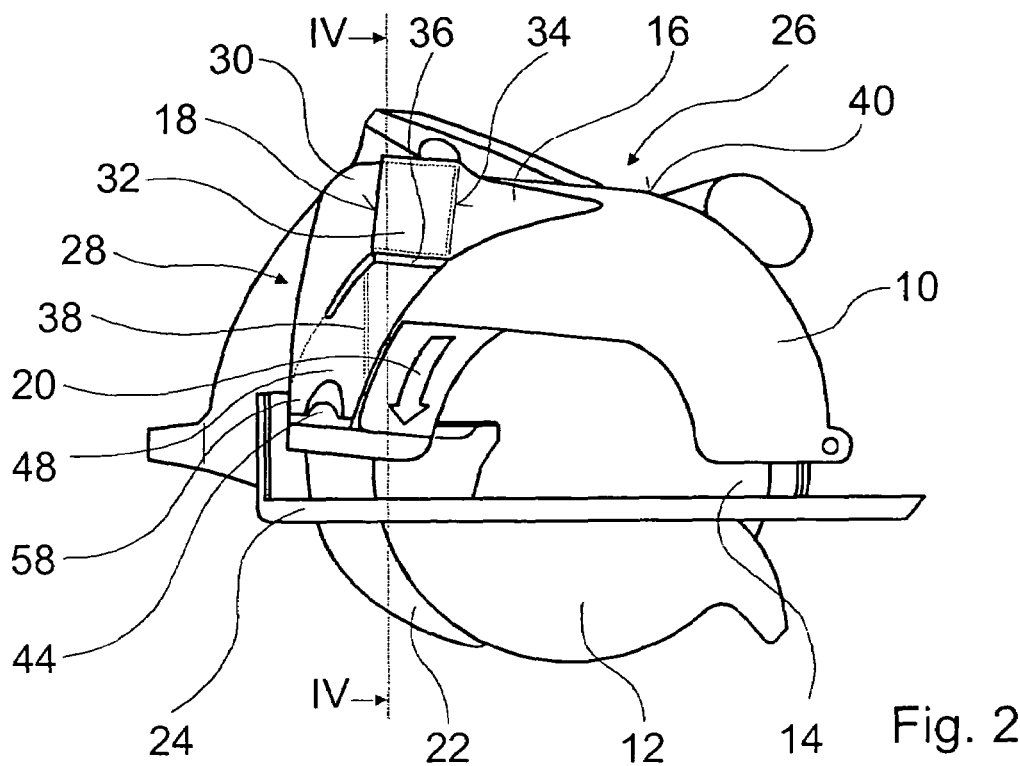
FIG. 2 shows a side view of a preferred hand-guided circular saw, with a chip catcher.

FIG. 2 shows a side view of the power tool 26 embodied in the form of a preferred hand-guided circular saw from FIG. 1, with a chip catcher 30. With regard to characteristics and functions that remain the same, reference is hereby made to the description of FIG. 1. With an inlet region 32 embodied in the form of an insertion end, the chip catcher 30 is inserted into an opening 18 of a chip ejector 16 and produces a dust-tight connection. Alternatively, depending on the embodiment, the chip ejector 16 can also be inserted into the inlet region 32. The chip catcher 30 has an encasing, elongated housing 48 whose shape takes into account the existing rip fence 22 and therefore tapers from the inlet region 32 toward the bottom. The chip catcher 30 is integrated into the cover contour 28 of the safety guard 10. The inlet region 32 has an opening 34 through which the chip-laden air can travel into the chip catcher 30. A lower region of the chip catcher 30 remote from the inlet region 32 contains a separate chip-collecting region 58. This chip-collecting region 58 is closed at the bottom by a flap 44 that can be pivoted around a pivot axis. A separate air outlet 36 is situated just underneath the inlet region 32. A deflector 38 inside the chip catcher 30 is indicated with dashed lines. The deflector 38 at least partially screens the air outlet 36 and hinders chips on their way to the air outlet 36, whereas air can flow to the air outlet 36 essentially unhindered.

Figure 3:
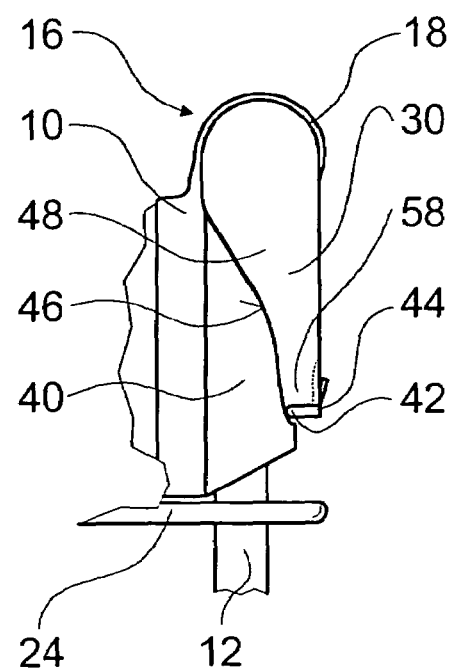
FIG. 3 shows a rear view of a chip catcher, FIGS. 4a, b, c respectively show a longitudinal section through a chip catcher (a), a flow of a chip/air mixture through a chip catcher with an open flap (b), and a flow of a chip/air mixture through a chip catcher with a closed flap (c)

FIG. 3 shows a rear view of a chip catcher 30 fastened to a safety guard 10. With regard to characteristics and functions that remain the same, reference is hereby made to the description of the preceding figures. The chip catcher 30 is situated against a circumference 40 of the safety guard 10 so that it is integrated into a cover contour 28 of the safety guard 10. It is clear it that the chip catcher 30 opens into an opening 18 of a chip ejector 16 that is a component of the safety guard 10. At the lower end of the chip catcher 30, there is a flap 44 that can be pivoted around a pivot point 42 and closes a chip-collecting region 58.

Figure 4A:
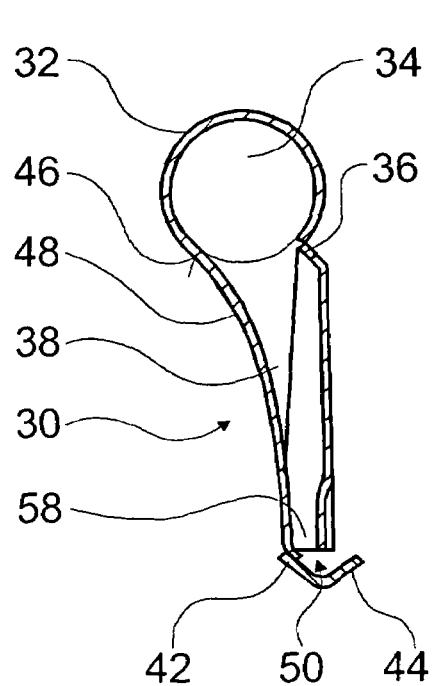

FIGS. 4a, b, c each show a longitudinal section through a chip catcher 30. With regard to characteristics and functions that remain the same, reference is hereby made to the description of the preceding figures.

FIG. 4 a shows a round opening 34 of an inlet region 32 embodied in the form of an insertion end. An air inlet 36 is situated on the circumference below the opening 34. Between the opening 34 and the air outlet 36, there is a deflector 38 via which at least part of the incoming air can travel to the air outlet 36. In the lower region, there is a chip-collecting region 58 with an opening 50 that can be closed by a flap 44 that can be pivoted around a pivot point 42. When the flap 44 is open, chips 56 that have gathered in the chip-collecting region 58 can be removed from the chip catcher 30 and ejected at low speed next to the power tool 26. In this connection, when in the open state, the flap 44 serves as a chip chute and/or as an extension of a chip chute that is comprised, for example, by the interior of the housing 48.

Figure 5:
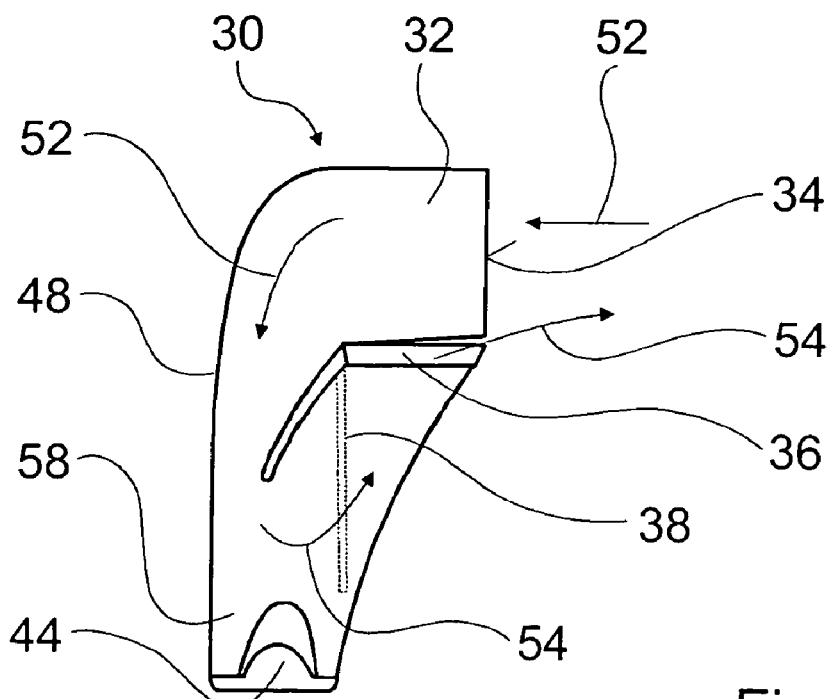
FIG. 5 shows a side view of a chip catcher with a flow of a chip/air mixture when the flap is closed.

As seen in FIG. 5, the chip catcher 30 has the inlet region 32 at one end thereof and the flap 44 at the other end thereof opposing the one end.

Figure 4B:
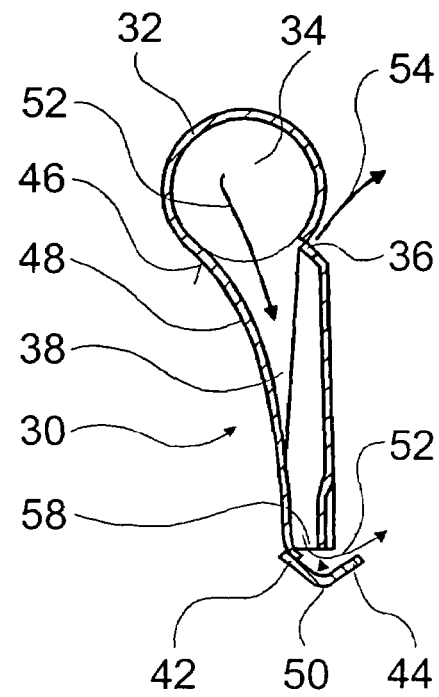

FIG. 4b shows a flow, indicated by arrows, of a chip/air mixture 52 coming in through the opening 34, through the chip catcher 30, and to the open flap 44 in the lower region of the chip catcher 30. While part of the air travels with the chip/air mixture 52 out through the opening 50, part of the air 54 from which the chips have been essentially removed flows through the deflector 38 and out an air outlet 36 situated behind it. The remaining chip/air mixture 52 is braked and can be ejected to the outside at low speed through the opening 50.

Figure 4C:
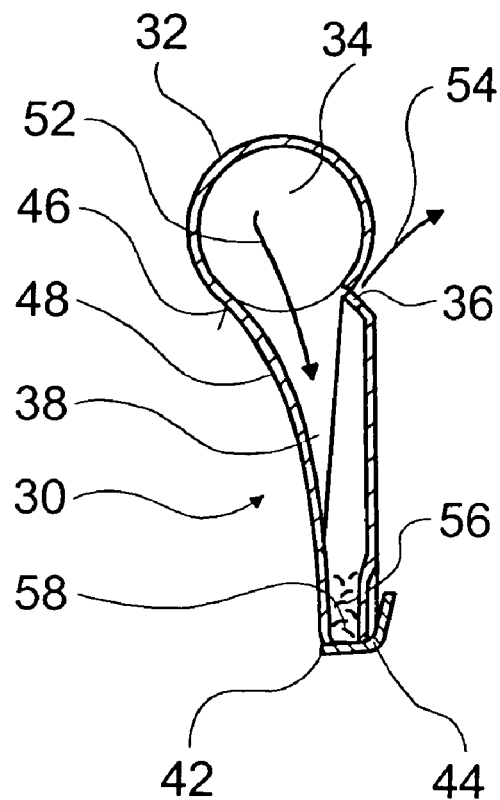

FIG. 4c shows a flow, indicated by arrows, of a chip/air mixture 52 through the chip catcher 30 with a closed flap 44. Now, air can no longer flow out through the chip-collecting region 58 and the opening 50. All of the air 54 is conveyed out through the air outlet 36 and must follow the path through the deflector 38, while a large percentage of chips 56 are braked and collect in the chip-collecting region 58 above the closed flap 44. A laterally curved contour 46 between the inlet region 32 and the chip-collecting region 58 is embodied as pear-shaped and encourages a cyclone-like action in the chip catcher 30.

FIG. 5 shows a side view of a chip catcher 30 with a flow of a chip/air mixture 52 when the flap 44 is closed. With regard to characteristics and functions that remain the same, reference is hereby made to the description of the preceding figures. A chip/air mixture 52 comes in through an opening 34 of an inlet region 32 embodied in the form of an insertion end and is conveyed downward in the direction of the chip-collecting region 58. Air 54 from which the chips have been removed flows out through an air outlet 36 situated close to the opening 34, while chips 56 collect in the chip-collecting region 58. The drawing clearly shows that the flow of the outgoing air 54 has reversed directions in comparison to the incoming chip/air mixture 52 and shows the long path, which must be traveled to reach the air outlet 36 and which advantageously serves to remove chips 56 from the air 54.

What is claimed is:

1. A system comprised of:
   a power tool (26) that generates chips (56);
   a safety guard (10) for the power tool (26);
   a chip ejector (16) for the power tool (26); and
   a chip catcher for the power tool (26), wherein the chip catcher has two opposing ends, an inlet region (32) at one of the opposing ends for admitting a flow of air containing a chip/air mixture (52) and for detachably connecting to the chip ejector (16) and has an encompassing housing (48) that is provided for attachment to the safety guard (10),
   wherein the housing (48) contains an air outlet (36) spatially separate from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and wherein the chip catcher is situated on the circumference (40) of the safety guard (10), wherein the chip catcher (30) has a flap (44) at the other of the opposing ends for removing chips (56) and wherein when the power tool (26) is operated and the flap (44) is opened, chips are ejected at low speed next to the power tool (26).

2. The system as recited in claim 1, wherein a deflector (38) provides a division between the air outlet (36) and the chip-collecting region (58) of the chip catcher.

3. The system as recited in claim 1 wherein between the inlet region (32) and the air outlet (36) of the chip catcher, deflecting means are provided for reversing the direction of the air flow.

4. The system as recited in claim 1, wherein the housing (48) of the chip catcher is essentially air-impermeable.

5. The system recited in claim 1, wherein the inlet region (32) of the chip catcher (30) is embodied in the form of an insertion end through which the chip catcher is inserted into the opening (18) of the chip ejector (16) and produces a dust-type connection so that it is adapted to the cover contour (28) of the safety guard (10).

6. The system as recited in claim 1, wherein the chip catcher (30) is integrated into the cover contour (28) of the safety guard (10) by the encompassing housing (48) whose shape takes into account an existing rip fence (22) of the power tool (26) and therefore tapers from the inlet region (32) toward the chip-collecting region (58).

7. The system as recited in claim 1, wherein when the flap (44) is in the open state, it constitutes a chip chute and/or serves as an extension of a chip chute.

8. A system comprised of:
   a hand-guided power tool (26) that generates chips (56);
   a safety guard (10) for the power tool (26);
   a chip ejector (16) for the power tool (26);
   and a chip catcher for the power tool (26);
   wherein the chip catcher has two opposing ends, an inlet region (32) at one of the opposing ends for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separate from a chip-collecting region (58) of the chip catcher for chips (56), wherein the safety guard (10) is equipped with the chip ejector (16), wherein the safety guard (10) has two sidewalls which are spaced apart from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), wherein the chip catcher is situated on the circumference (40) of the safety guard (10), wherein the chip catcher (30) has a flap (44) at the other of the opposing ends for removing chips (56) and wherein when the power tool (26) is operated and the flap (44) is opened, chips are ejected at low speed next to the power tool (26).

9. A system comprised of:
a power tool (26) that generates chips (56);
a safety guard (10) for the power tool (26);
a chip ejector (16) for the power tool (26); and
a chip catcher for the power tool (26);
wherein the chip catcher has an inlet region (32) for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), and wherein the chip catcher is integrated into the cover contour (28) of the safety guard (10) by the encompassing housing (48) whose shape takes into account an existing rip fence (22) of the power tool (26) and therefore tapers from the inlet region (32) toward the chip-collecting region (58).

10. A system comprised of:
a hand-guided power tool (26) that generates chips (56);
a safety guard (10) for the power tool (26);
a chip ejector (16) for the power tool (26); and
a chip catcher for the power tool (26);
wherein the chip catcher has an inlet region (32) for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), and wherein the chip catcher is integrated into the cover contour (28) of the safety guard (10) by the encompassing housing (48) whose shape takes into account an existing rip fence (22) of the power tool (26) and therefore tapers from the inlet region (32) toward the chip-collecting region (58).

11. A system comprised of:
a power tool (26) that generates chips (56);
a safety guard (10) for the power tool (26);
a chip ejector (16) for the power tool (26); and
a chip catcher for the power tool (26);
wherein the chip catcher has an inlet region (32) for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), and wherein the chip catcher is integrated into the cover contour (28) of the safety guard (10) by the encompassing housing (48) whose shape takes into account an outer contour of the safety guard (10).

12. A system comprised of:
a hand-guided power tool (26) that generates chips (56);
a safety guard (10) for the power tool (26);
a chip ejector (16) for the power tool (26); and
a chip catcher for the power tool (26);
wherein the chip catcher has an inlet region (32) for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), and wherein the chip catcher is integrated into the cover contour (28) of the safety guard

(10) by the encompassing housing (48) whose shape takes into account an outer contour of the safety guard (10).

13. A system comprised of:
a power tool (26) that generates chips (56);
a safety guard (10) for the power tool (26);
a chip ejector (16) for the power tool (26); and
a chip catcher for the power tool (26);
wherein the chip catcher has two opposing ends, an inlet region (32) at one of the opposing ends for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), wherein the chip catcher (30) has a flap (44) at the other of the opposing ends for removing chips (56) and wherein when the flap (44) is in the open state, it constitutes a chip chute and/or serves as an extension of a chip chute.

14. A system comprised of:
a hand-guided power tool (26) that generates chips (56);
a safety guard (10) for the power tool (26);
a chip ejector (16) for the power tool (26); and
a chip catcher for the power tool (26);
wherein the chip catcher has two opposing ends, an inlet region (32) at one of the opposing ends for admitting a flow of air containing a chip/air mixture (52) and for detachably connecting to the chip ejector (16) and has an encompassing housing (48) that is provided for attachment to the safety guard (10), wherein the housing (48) contains an air outlet (36) spatially separated from a chip-collecting region (58) of the chip catcher for chips (56), wherein the safety guard (10) is equipped with the chip ejector (16), wherein the safety guard (10) has two sidewalls which are spaced from each other and are arranged parallel to a rotation plane of a tool member (14) of the power tool (26) and has a cover contour (28) which covers the tool member (14) in a radial direction of the tool member (14), wherein the cover contour (28) connects the two sidewalls with each other and is provided as a circumference (40) of the safety guard (10); and the chips (56) are transported in a rotation direction (20) of the tool member (14), wherein the chip ejector (16) is situated on the circumference (40) of the safety guard (10) and has an opening (18) through which the chips (56) exit the safety guard (10), and that the chip catcher is situated on the circumference (40) of the safety guard (10), wherein the chip catcher (30) has a flap (44) at the other of the opposing ends for removing chips (56) wherein when the flap (44) is in the open state, it constitutes a chip chute and/or serves as an extension of a chip chute.

* * * * *